(12) United States Patent
Gao et al.

(10) Patent No.: US 12,535,181 B2
(45) Date of Patent: Jan. 27, 2026

(54) ADJUSTING MECHANISM AND HEAD-MOUNTED DISPLAY APPARATUS

(71) Applicant: GOERTEK INC., Shandong (CN)

(72) Inventors: Aili Gao, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 398 days.

(21) Appl. No.: 18/041,950

(22) PCT Filed: Oct. 29, 2021

(86) PCT No.: PCT/CN2021/127430
§ 371 (c)(1),
(2) Date: Feb. 16, 2023

(87) PCT Pub. No.: WO2022/247140
PCT Pub. Date: Dec. 1, 2022

(65) Prior Publication Data
US 2023/0313941 A1    Oct. 5, 2023

(30) Foreign Application Priority Data

May 28, 2021   (CN) .......................... 202110593456.3

(51) Int. Cl.
*G06F 1/16* (2006.01)
*F16M 13/02* (2006.01)
*F16M 13/04* (2006.01)

(52) U.S. Cl.
CPC ........... *F16M 13/022* (2013.01); *G06F 1/163* (2013.01); *F16M 13/04* (2013.01)

(58) Field of Classification Search
CPC ...... F16M 13/022; G06F 1/163; G02B 27/017
See application file for complete search history.

(56) References Cited

U.S. PATENT DOCUMENTS

| | | | |
|---|---|---|---|
| 2014/0098009 A1* | 4/2014 | Prest ................. | G02B 27/0172 345/8 |
| 2015/0219901 A1* | 8/2015 | Morimoto .......... | G02B 27/0176 345/8 |

(Continued)

FOREIGN PATENT DOCUMENTS

| CN | 201705797 U | 1/2011 |
|---|---|---|
| CN | 104503086 A | 4/2015 |

(Continued)

OTHER PUBLICATIONS

CN 209028318 U machine translation (Year: 2019).*
CN 209198764 U machine translation (Year: 2019).*

*Primary Examiner* — James A Dudek
(74) *Attorney, Agent, or Firm* — Ingrassia Fisher & Lorenz, LLP

(57) ABSTRACT

An adjusting mechanism is disclosed. The adjusting mechanism includes, but is not limited to, a middle shell and a foam support. The adjusting mechanism further includes, but is not limited to a sliding module movably arranged in the middle shell, connected with the foam support, and configured to adjust a horizontal spacing between the middle shell and the foam support. The adjusting mechanism still further includes, but is not limited to, a flipping module rotatably arranged on the sliding module, connected with the foam support, and configured to drive the foam support to flip relative to the middle shell.

16 Claims, 10 Drawing Sheets

(56) References Cited

U.S. PATENT DOCUMENTS

| | | |
|---|---|---|
| 2018/0059776 A1 | 3/2018 | Jiang et al. |
| 2018/0295733 A1 | 10/2018 | Wen et al. |
| 2021/0026148 A1 | 1/2021 | Yoon et al. |

FOREIGN PATENT DOCUMENTS

| | | |
|---|---|---|
| CN | 104977718 A | 10/2015 |
| CN | 204756690 U | 11/2015 |
| CN | 106019602 A | 10/2016 |
| CN | 106383405 A | 2/2017 |
| CN | 207067538 U | 3/2018 |
| CN | 207316432 U | 5/2018 |
| CN | 108111940 A | 6/2018 |
| CN | 207516644 U | 6/2018 |
| CN | 108710211 A | 10/2018 |
| CN | 208689274 U | 4/2019 |
| CN | 209028318 U | 6/2019 |
| CN | 209198764 U | 8/2019 |
| CN | 110376740 A | 10/2019 |
| CN | 212259103 U | 12/2020 |
| CN | 113325587 A | 8/2021 |
| CN | 214540245 U | 10/2021 |
| EP | 3308675 A1 | 4/2018 |

\* cited by examiner

ADJUSTING MECHANISM AND HEAD-MOUNTED DISPLAY APPARATUS

CROSS-REFERENCE TO RELATED APPLICATIONS

This Application is a U.S. National-Stage entry under 35 U.S.C. § 371 based on International Application No. PCT/CN2021/127430, filed Oct. 29, 2021 which was published under PCT Article 21(2) and which claims priority to Chinese Application No. 202110593456.3, filed May 28, 2021, which are all hereby incorporated herein in their entirety by reference.

TECHNICAL FIELD

This application pertains to the technical field of wearable devices, in particular to an adjusting mechanism. The present disclosure also relates to a head-mounted display apparatus.

BACKGROUND

With the development of virtual reality and augmented reality technology, more and more HMDs have been widely used.

AR (Augmented Reality) technology is a technology that skillfully integrates virtual information with the real world. It widely uses multimedia, 3D modeling, real-time tracking and registration, intelligent interaction, sensing and other technical means. After simulating the virtual information generated by computer, such as text, image, 3D model, music, video, etc., it is applied to the real world. The two kinds of information complement each other, thereby realizing the "enhancement" of the real world.

VR (Virtual Reality) technology is a computer simulation system that can create and experience a virtual world. It uses computers to create a simulation environment and make users immerse in the environment. Virtual reality technology uses the data in real life and the electronic signals generated by computer technology, combines them with various output devices to transform them into phenomena that can be felt by people.

To facilitate wearing, the head-mounted display apparatus is usually equipped with a foam bracket on the device body, and the middle shell of the device body is provided therein with a lens module. The foam bracket is a generally circular structure with a handle. The circular structure is used to clamp the forehead, side and back of the head of the user to ensure that the user can wear it firmly, and it is connected with the middle shell via the handle structure.

However, since the foam bracket and the middle shell are fixed as a whole structure, the parameters such as the size and design angle of the foam bracket are fixed when it leaves the factory. Thus, on the one hand, the horizontal distance between the foam bracket and the lens module is made fixed, that is, the eye relief (ER) is fixed. For different users, the optimal eye relief must be different. The head-mounted display apparatus in the prior art obviously cannot meet the user's personalized adjustment demand for the eye relief. On the other hand, the user cannot adjust the wearing angle when wearing the foam bracket around the head, which cannot meet the actual wearing needs of different users. It is difficult to properly fix on the head of the user when wearing, and the user experience is poor.

Therefore, it is a technical problem faced by those skilled in the art how to realize the adjustment of the eye relief and the wearing angle of the head-mounted display apparatus, meet the user's personalized adjustment needs for the eye relief and the wearing angle, and improve the user experience. In addition, other objects, desirable features and characteristics will become apparent from the subsequent summary and detailed description, and the appended claims, taken in conjunction with the accompanying drawings and this background.

SUMMARY

The object of the present disclosure is to provide an adjusting mechanism, which can realize the adjustment of the eye relief and the wearing angle of the head-mounted display apparatus, meet the user's personalized adjustment needs for the eye relief and the wearing angle, and improve the user experience. Another object of the present disclosure is to provide a head-mounted display apparatus.

In order to solve the above technical problem, the present disclosure provides an adjusting mechanism, comprising a middle shell and a foam support. The adjusting mechanism further comprises: a sliding module movably arranged in the middle shell, connected with the foam support, and configured to adjust a horizontal spacing between the middle shell and the foam support; and a flipping module rotatably arranged on the sliding module, connected with the foam support, and configured to drive the foam support to flip relative to the middle shell.

Preferably, the sliding module comprises: a mounting bracket connected with an inner wall of the middle shell; a guide bracket arranged on a surface of the mounting bracket; and a sliding plate slidably arranged on the guide bracket and connected with the flipping module.

Preferably, both sides of a surface of the guide bracket are provided with a guide rail extending along its length direction for sliding in cooperation with two side edges of the sliding plate.

Preferably, a surface of the guide bracket is provided with an inner stop block and an outer stop block, the inner stop block is configured to butt against an inner end wall of the sliding plate to limit a maximum distance that the sliding plate slides inward, and the outer stop block is configured to butt against an outer end wall of the sliding plate to limit a maximum distance that the sliding plate slides outward.

Preferably, a surface of the guide bracket is also provided with an elastic sheet bulging upward, a bottom surface of the sliding plate is provided with multiple stages of parking slots bulging downward and configured to clamp a top end of the elastic sheet, and an arrangement direction of each stage of the parking slots is parallel to a sliding direction of the sliding plate.

Preferably, two ends of the elastic sheet are respectively connected to the surface of the guide bracket, and a middle part of the elastic sheet is arched into an arc shape.

Preferably, the flipping module comprises a connecting shaft connected with a tail end of the sliding module, and a rotary arm rotatably sleeved on the connecting shaft, and a tail end of the rotary arm is connected with the foam support.

Preferably, both ends of the connecting shaft are provided with ring grooves, the rotary arms are respectively accommodated in the ring grooves, and side walls of the ring grooves are closely attached to the surfaces of the rotary arms to form damping friction.

Preferably, an outer wall of the ring groove is a head end of a pressing rod inserted in an end face of the connecting shaft, and an end surface of the head end of the pressing rod is provided with a knob configured to adjust a preload of the pressing rod.

Preferably, an inner wall surface of the ring groove is provided thereon with a position-limiting groove extending in a circumferential direction, and an inner surface of the rotary arm is provided thereon with a butting block configured to butt with walls at both ends of the position-limiting groove to limit a range of rotation angle of the rotary arm.

Preferably, the flipping module comprises: a connecting shaft connected with a tail end of the sliding module, a rotary arm rotatably sleeved on the connecting shaft and connected with the foam support, an angle adjusting disc arranged on the connecting shaft, a connection seat connected to the foam support and extending to the angle adjusting disc, and a stop stud arranged on the surface of the connection seat; a surface of the angle adjusting disc is provided with several stop grooves configured to match with the stop stud to lock the stop stud in a current rotation position.

Preferably, the angle adjusting disc is erected on the circumferential surface of the connecting shaft, the stop stud is perpendicular to a surface of the angle adjusting disc, a surface of the connection seat is provided with an insertion hole, and a head end of the stop stud is detachably inserted into the insertion hole.

Preferably, the stop stud comprises: a stop cylinder inserted in the insertion hole, a return spring axially connected in the stop cylinder, and an elastic ball stuffed at an opening of the stop cylinder and projecting outwards; an end of the return spring is connected with the elastic ball.

Preferably, the elastic ball comprises a blunt end and a sharp end connected as a whole, the blunt end is clamped at the opening of the stop cylinder, and the sharp end extends out of the opening of the stop cylinder and is matched with the stop groove.

Preferably, the flipping module comprises: a connecting shaft connected with a tail end of the sliding module; a rotary arm rotatably sleeved on the connecting shaft and connected with the foam support, a fixed adjusting plate arranged on the connecting shaft, a connection seat connected to the foam support and extended to the fixed adjusting plate, and a movable adjusting rod inserted in the connection seat in an axially retractable manner; an end face of the movable adjusting rod is provided with a plurality of end face teeth distributed along its flipping track; and a surface of the fixed adjusting plate is provided with a plurality of tooth shaped grooves for engaging with the end face teeth.

Preferably, the fixed adjusting plate is erected on a circumferential surface of the connecting shaft, the retraction direction of the movable adjusting rod is perpendicular to the surface of the fixed adjusting plate, a tail end of the movable adjusting rod is connected with an arc-shaped plate, and the end face teeth are distributed on a surface of the arc-shaped plate.

Preferably, an insertion hole is provided on a surface of the connection seat, a head end of the movable adjusting rod is inserted into the insertion hole in a retractable manner, and the movable adjusting rod is sleeved with a preload spring for compressing a tail end of the movable adjusting rod against the fixed adjusting plate through an elastic force.

Preferably, multiple position-limiting ribs are provided on a circumferential surface of the movable adjusting rod, and multiple stop grooves are provided on a radial direction of the insertion hole for sliding in cooperation with the position-limiting ribs to limit a degree of rotation freedom of the movable adjusting rod.

The present disclosure also provides a head-mounted display apparatus, which comprises an adjusting mechanism as described in any one of the above items.

The adjusting mechanism according to the present disclosure mainly comprises a middle shell, a foam support, a sliding module and a flipping module. The middle shell is the main structure of the main body of the equipment and is mainly configured to install other components and parts. The foam bracket is connected with the middle shell, surrounds and is fixed on the head, and is mainly used for users to wear. The sliding module is arranged in the middle shell and connected between the middle shell and the foam support. It can move directionally in the middle shell, and is mainly configured to change the horizontal distance between the middle shell and the foam support during its movement, thereby realizing the adjustment of the eye relief. The flipping module is connected between the sliding module and the foam support. An end of the flipping module is rotationally connected with the sliding module, and can rotate directionally on the sliding module. It is mainly configured to drive the foam support to rotate synchronously during the rotation process, so that the foam support can flip relative to the middle shell, thereby realizing the adjustment of the wearing angle of the foam support. In this way, by changing the horizontal distance between the middle shell and the foam support through the directional movement of the sliding module in the middle shell, the adjustment of eye relief of the head-mounted display apparatus can be realized. The adjustment of the wearing angle of the head-mounted display apparatus can be realized by driving the foam support by the flipping module to rotate around the sliding module. When the eye relief needs to be adjusted, the user only needs to pull the foam bracket to move inward and outward with respect to the middle shell, and when the wearing angle needs to be adjusted, the user only needs to rotate the foam bracket to flip clockwise or counterclockwise with respect to the middle shell. In conclusion, the adjusting mechanism according to the present disclosure can realize the adjustment of the eye relief and the wearing angle of the head-mounted display apparatus, meet the user's personalized adjustment needs for the eye relief and the wearing angle, and improve the user experience.

BRIEF DESCRIPTION OF DRAWINGS

The present invention will hereinafter be described in conjunction with the following drawing figures, wherein like numerals denote like elements, and:

In FIG. 1 to FIG. 17:

1, middle shell; 2, foam bracket; 3, sliding module; 4, flipping module;

31, mounting bracket; 32, guide bracket; 33, sliding plate; 34, guide rail; 35, inner stop block; 36, outer stop block; 37, elastic sheet; 38, parking slot; 39, thrust stop block;

41a, connecting shaft; 42a, rotary arm; 43a, pressing rod; 44a, knob; 411, ring groove; 412, position-limiting groove; 421a, connecting plate; 422, butting block;

41b, connecting shaft; 42b, rotary arm; 43b, angle adjusting disc; 44b, connection seat; 45b, stop stud; 421b, connecting plate; 431b, stop groove; 441b, insertion hole; 451b, stop cylinder; 452b, return spring; 453b, elastic ball; 4531, blunt end; 4532, sharp end;

41c, connecting shaft; 42c, rotary arm; 43c, fixed adjusting plate; 44c, connection seat; 45c, movable adjusting rod; 46, preload spring; 421c, connecting plate; 431c, tooth shaped groove; 441c, insertion hole; 451c, end face tooth; 452c, arc-shaped plate; 453c, position-limiting rib; 442, stop groove.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

Figure 1:
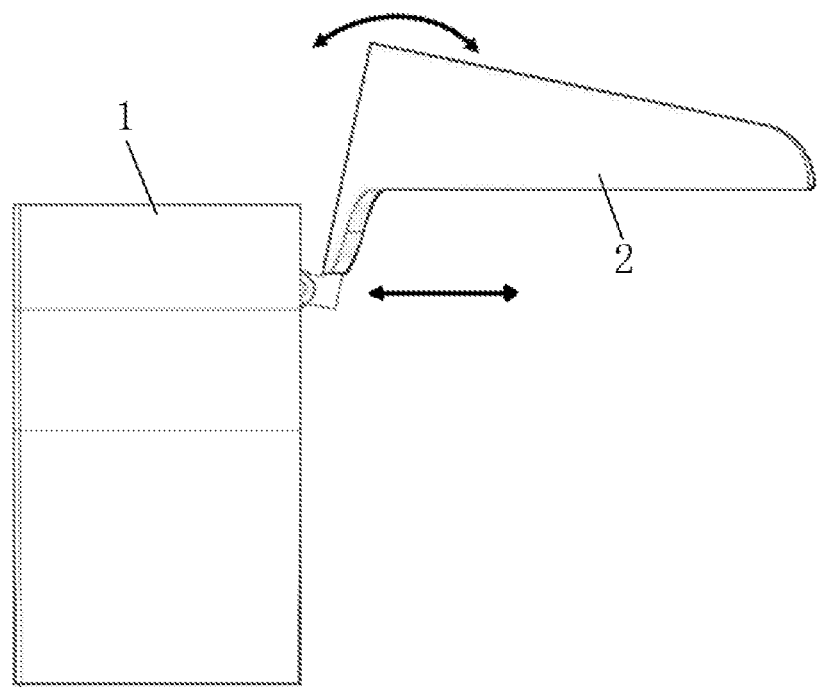
FIG. 1 is a schematic diagram of the overall structure of a specific embodiment of the present disclosure.
Figure 2:
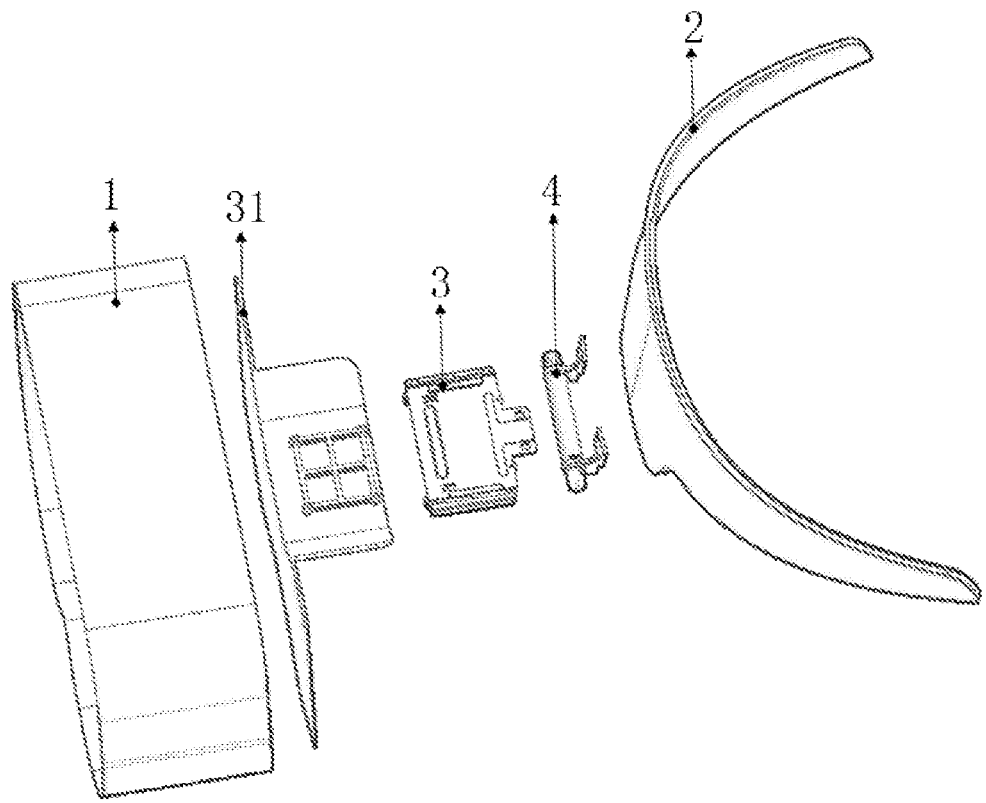
FIG. 2 is an exploded view of the structure of FIG. 1.

Referring to FIG. 1 and FIG. 2, FIG. 1 is a schematic diagram of the overall structure of a specific embodiment of the present disclosure; FIG. 2 is an exploded view of the structure of FIG. 1.

In a specific embodiment of the present disclosure, the adjusting mechanism mainly comprises a middle shell 1, a foam support 2, a sliding module 3 and a flipping module 4.

The middle shell 1 is the main structure of the main body of the equipment, which is mainly configured to install and accommodate other components and parts. The foam bracket 2 is connected with the middle shell 1, surrounds and is fixed on the head, and is mainly used for users to wear.

The sliding module 3 is arranged in the middle shell 1 and connected between the middle shell 1 and the foam support 2. It can move directionally in the middle shell 1, and is mainly configured to change the horizontal distance between the middle shell 1 (and the lens module installed therein) and the foam support 2 during its movement, thereby realizing the adjustment of the eye relief.

The flipping module 4 is connected between the sliding module 3 and the foam support 2. An end of the flipping module 4 is rotationally connected with the sliding module 3, and can rotate directionally on the sliding module 3. It is mainly configured to drive the foam support 2 to rotate synchronously during the rotation process, so that the foam support 2 can flip relative to the middle shell 1, thereby realizing the adjustment of the wearing angle of the foam support 2.

In this way, by changing the horizontal distance between the middle shell 1 and the foam support 2 through the directional movement of the sliding module 3 in the middle shell 1, the adjustment of eye relief of the head-mounted display apparatus can be realized. The adjustment of the wearing angle of the head-mounted display apparatus can be realized by driving the foam support 2 by the flipping module 4 to rotate around the sliding module 3. When the eye relief needs to be adjusted, the user only needs to pull the foam bracket 2 to move inward and outward with respect to the middle shell 1, and when the wearing angle needs to be adjusted, the user only needs to rotate the foam bracket 2 to flip clockwise or counterclockwise with respect to the middle shell 1.

In conclusion, the adjusting mechanism according to this embodiment can realize the adjustment of the eye relief and the wearing angle of the head-mounted display apparatus, meet the user's personalized adjustment needs for the eye relief and the wearing angle, and improve the user experience.

Figure 3:
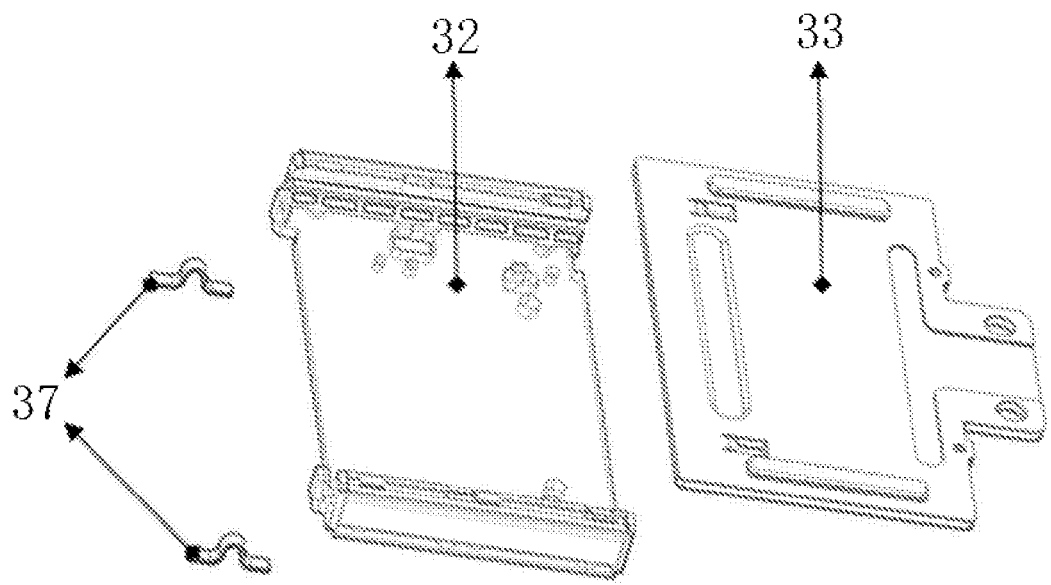
FIG. 3 is a schematic diagram of the breakdown structure of a sliding module.

As shown in FIG. 3, FIG. 3 is a schematic diagram of the breakdown structure of the sliding module 3.

In a preferred embodiment of the sliding module 3, the sliding module 3 comprises a mounting bracket 31, a guide bracket 32, and a sliding plate 33. The mounting bracket 31 is arranged in the middle shell 1, connected with the inner wall of the middle shell 1, and has a plate body disposed in the horizontal direction. The guide bracket 32 is arranged on the surface of the mounting bracket 31, and the sliding plate 33 is arranged on the surface of the guide bracket 32, and the sliding plate 33 can perform reciprocating sliding movement on the surface of the guide bracket 32. At the same time, a tail end of the sliding plate 33 is connected with the flipping module 4, and the sliding direction of the sliding plate 33 is the direction of the horizontal spacing between the middle shell 1 and the foam support 2. In this way, when the sliding plate 33 slides on the guide bracket 32, the foam bracket 2 can be driven to move synchronously by the flipping module 4, thereby changing the distance between the middle shell 1 and the foam bracket 2 in real time and realizing the adjustment of the eye relief.

Generally, in order to facilitate the connection between the sliding plate 33 and the flipping module 4, in this embodiment, the tail end of the sliding plate 33 is provided with fasteners such as bolts to connect with flat grooves formed on the connecting shafts 41a, 41b and 41c in the flipping module 4; moreover, the axial directions of the connecting shafts 41a, 41b and 41c are generally perpendicular to the sliding direction of the sliding plate 33, and maintain a horizontal state.

Figure 4:
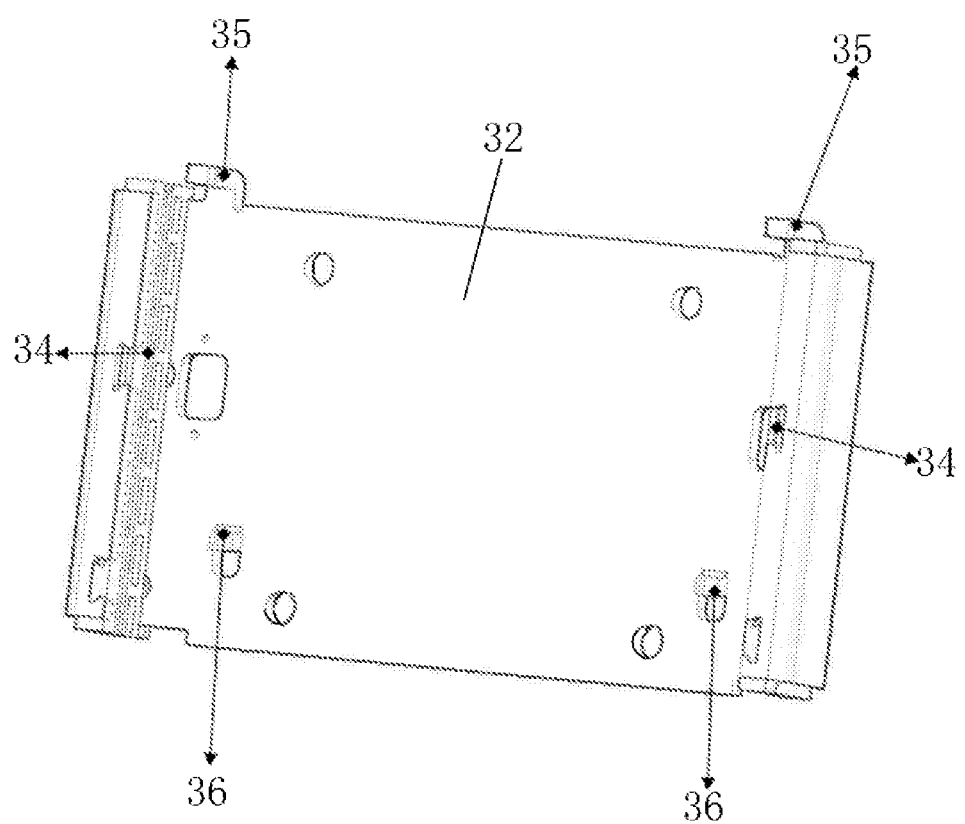
FIG. 4 is a schematic diagram of the specific structure of a guide bracket.

As shown in FIG. 4, FIG. 4 is a schematic diagram of the specific structure of the guide bracket 32.

Specifically, in this embodiment, both sides of the surface of the guide bracket 32 are provided with guide rails 34, so that two side edges of the sliding plate 33 are respectively installed into the guide rails 34, the sliding plate 33 can slide back and forth along the length direction of the guide rail 34, thus, the guide rail 34 has the function of guiding the linear movement of the sliding plate 33. Generally, the length direction of the guide sliding plate 33 can extend along the length direction or width direction of the guide bracket 32, and is parallel to a direction of a straight line along the eye relief.

Considering that the adjustment range of the eye relief is generally short, in this embodiment, the surface of the guide bracket 32 is provided thereon with an inner stop block 35 and an outer stop block 36. The inner stop block 35 is mainly configured to butt with the inner end wall of the sliding plate 33 to limit the maximum distance that the sliding plate 33 slides inwards (toward the direction of the middle shell 1) on the guide rail 34, thereby limiting the minimum value of the eye relief. The outer stop 36 is mainly configured to butt with the outer end wall of the sliding plate 33 to limit the maximum distance that the sliding plate 33 slides outward (toward the foam support 2) on the guide rail 34, thereby limiting the maximum value of the eye relief. Considering that the sliding plate 33 is wide, two inner stop blocks 35 and two outer stop blocks 36 may be provided, and two inner stop blocks 35 are respectively disposed on two ends of the inner side of the surface of the guide bracket 32, while two outer stop blocks 36 are respectively disposed on two ends of the outer side of the surface of the guide bracket 32.

Of course, alternatively, a thrust stop block 39 may be provided on the surface of the sliding plate 33 to replace the end walls of the sliding plate 33 to butt with the inner stop block 35 or the outer stop block 36, which can also limit the sliding stroke of the sliding plate 33 and the adjustment range of the eye relief.

Figure 5:
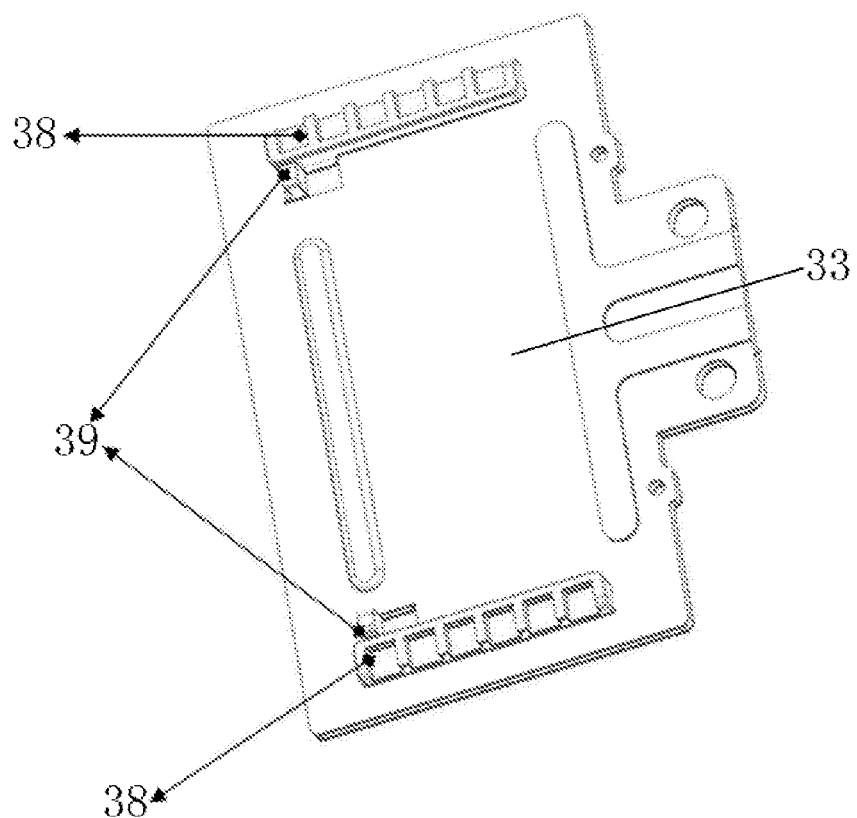
FIG. 5 is a schematic diagram of the specific structure of a sliding plate.

As shown in FIG. 5, FIG. 5 is a schematic diagram of the specific structure of the sliding plate 33.

In addition, in order to give the user the hand tactile feedback of the adjusted distance value in the process of adjusting the eye relief, and facilitate the user to fix the eye relief at the target value according to the estimated adjusted distance value, staged adjustment of the eye relief is used in this embodiment. Specifically, in this embodiment, an elastic sheet 37 is further provided on the surface of the guide bracket 32, and multiple parking slots 38 are provided on the bottom surface of the sliding plate 33.

The elastic sheet 37 protrudes upward with a certain height from the surface of the guide bracket 32, while each parking slot 38 protrudes downward with a certain distance from the bottom face of the sliding plate 33, so that the top end of the elastic sheet 37 can be clamped into each parking slot 38. Moreover, the arrangement direction of the parking slots 38 on the sliding plate 33 is parallel to the sliding direction of the sliding plate 33. In this way, when the sliding plate 33 slides directionally on the surface of the guide bracket 32, the top end of the elastic sheet 37 will snap into one of the parking slots 38, and the sliding plate 33 will stop at the current sliding position. When the user pulls the foam support 2 with a great force, the pull force is transmitted to the sliding plate 33, the top end of the elastic sheet 37 is subject to the butting force of the current parking slot 38 to produce elastic deformation and thus leave the current parking slot 38 and unlock the sliding plate 33. After the sliding plate 33 continues to move for a certain distance, the elastic sheet 37 is clamped again into a new parking slot 38.

Figure 6:
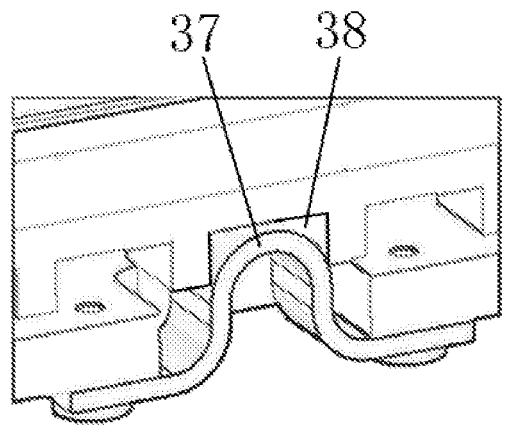
FIG. 6 is a schematic diagram of engagement of an elastic sheet and a parking slot.

As shown in FIG. 6, FIG. 6 is a schematic diagram of the engagement of the elastic sheet 37 and the parking slot 38.

Further, in order to facilitate the elastic sheet 37 to snap into the parking slot 38 and disengage from the parking slot 38, in this embodiment, two ends of the elastic sheet 37 are respectively connected to the surface of the guide bracket 32. At the same time, the middle part of the elastic sheet 37 is arched into an arc, so that the elastic sheet 37 can smoothly produce elastic deformation under the transitional action of the arc structure.

Figure 7:
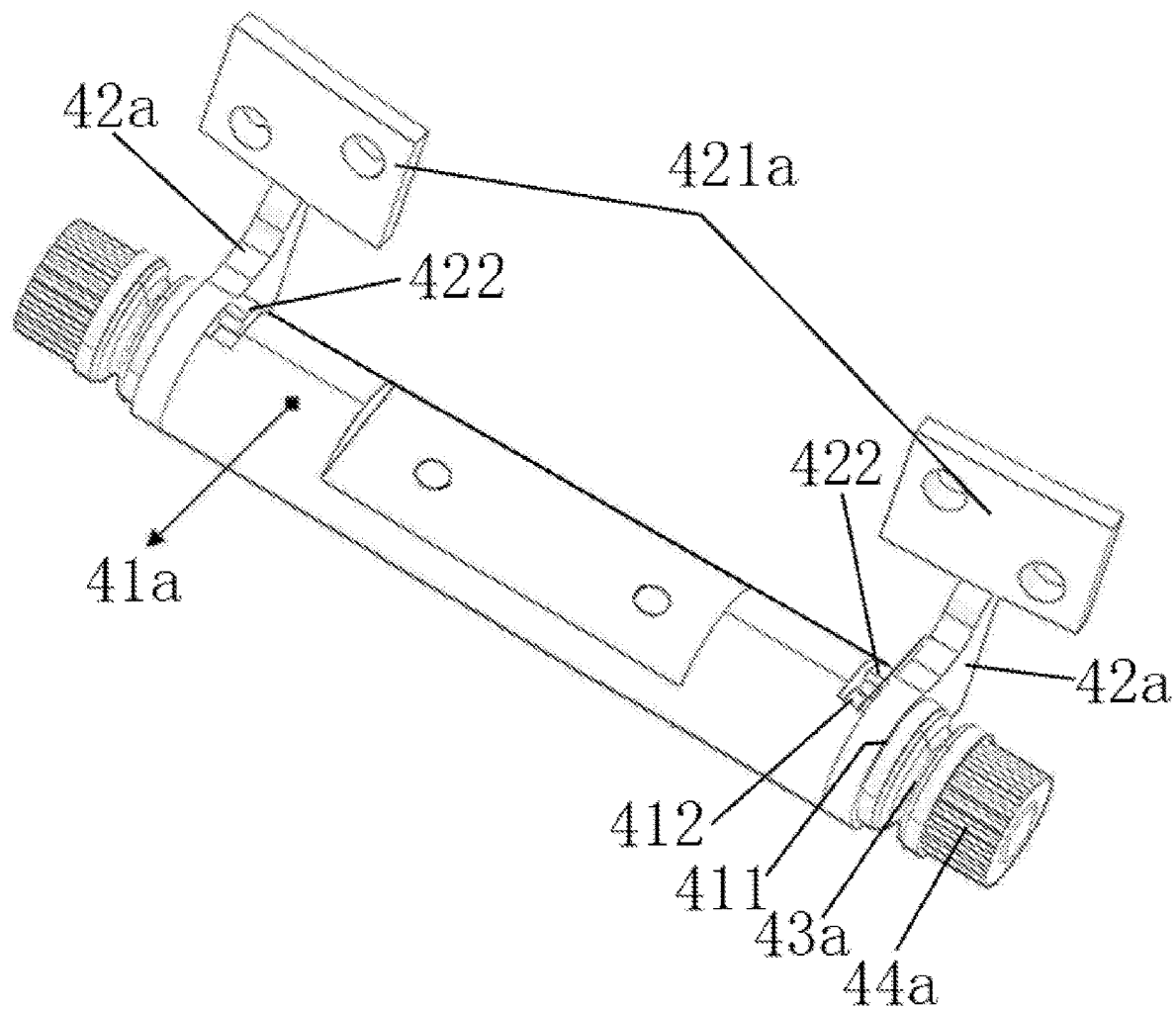
FIG. 7 is a schematic diagram of a first specific structure of a flipping module.

As shown in FIG. 7, FIG. 7 is the first specific structure diagram of the flipping module 4.

In the first preferred embodiment of the flipping module 4, the flipping module 4 mainly comprises a connecting shaft 41a and a rotary arm 42a. The connecting shaft 41a is connected with the sliding plate 33 in the sliding module 3. When the sliding module 3 moves directionally, the connecting shaft 41a moves directionally and synchronously with it. The head end of the rotary arm 42a is sleeved on the connecting shaft 41a, and can rotate around the connecting shaft 41a. At the same time, the tail end of the rotary arm 42a is connected with the foam support 2, and thus drives the foam support 2 to rotate around the connecting shaft 41a together. When the foam bracket 2 rotates, it is equivalent to flipping relative to the middle shell 1, thereby realizing the flipping angle adjustment of the foam bracket 2 on the middle shell 1 and further realizing the wearing angle adjustment of the forehead band.

In order to facilitate the rotary connection between the rotary arm 42a and the connecting shaft 41a, in this embodiment, a ring groove 411 is provided on the connecting shaft 41a so that the head end of the rotary arm 42a is accommodated in the ring groove 411, and the head end of the rotary arm 42a rotates around the ring groove 411. At the same time, the tail end of the rotary arm 42a is provided with a connecting plate 421a to connect with the foam support 2 via the connecting plate 421a, for example, by fasteners such as bolts. Generally, considering that the foam support 2 has a certain width, in order to ensure the connection stability and rotation stability, two rotary arms 42a are provided, the ring grooves 411 are provided at two axial ends of the connecting shaft 41a, and each rotary arm 42a is accommodated in the corresponding ring groove 411.

Further, in order to ensure that the foam support 2 can stay at any target flipping position when the user rotates the foam support 2 to adjust the wearing angle, in this embodiment, the side wall of each ring groove 411 and the surface of the corresponding rotary arm 42a are closely attached to each other, and the damping friction effect is formed by surface treatment. In this way, there is a certain interference effect between the rotary arm 42a and the ring groove 411, and the user needs to apply an appropriate torque on the foam support 2. When the rotary arm 42a rotates in the ring groove 411, it is subject to the damping effect and can stop at any rotation position at any time, so that the foam support 2 can stop at the target angle position at any time.

Further, in order to facilitate the adjustment of the damping friction effect between the ring groove 411 and the rotary arm 42a to realize both smoothly rotating and arbitrarily stopping, in this embodiment, alternatively, the outer wall of the ring groove 411 is replaced by the head end of the pressing rod 43a. Specifically, the pressing rod 43a is inserted in the end face of the connecting shaft 41a along the axial direction, and the inner end face of the head end of the pressing rod 43a presses the outer surface of the rotary arm 42a in the ring groove 411. At the same time, a knob 44a is further provided on the head end face of the pressing rod 43a to tighten or loosen the connection between the pressing rod 43a and the connecting shaft 41a by the knob 44a, and thus adjust the preloading and pressing degree of the pressing rod 43a on the outer surface of the rotary arm 42a, that is, to adjust the damping friction effect between the ring groove 411 and the rotary arm 42a.

In addition, in order to limit the flipping angle adjustment of the foam support 2 within a reasonable range, in this embodiment, a position-limiting groove 412 is further provided on the inner wall surface of the ring groove 411, and a butting block 422 is provided on the inner surface of the rotary arm 42a. Specifically, when the head end of the rotary arm 42a is accommodated in the ring sleeve, the butting block 422 is also disposed in the position-limiting groove 412 at the same time, and rotates synchronously in the position-limiting groove 412 with the rotation of the rotary arm 42a. At the same time, the position-limiting groove 412 is formed on the connecting shaft 41a along the circumferential direction within a preset angle range, so that when the butting block 422 butts against the walls on two sides of the position-limiting groove 412, the rotation angle ranges in two directions of the rotary arm 42a within the ring groove 411 is limited, thereby limiting the flipping angle range of the foam support 2.

Figure 8:
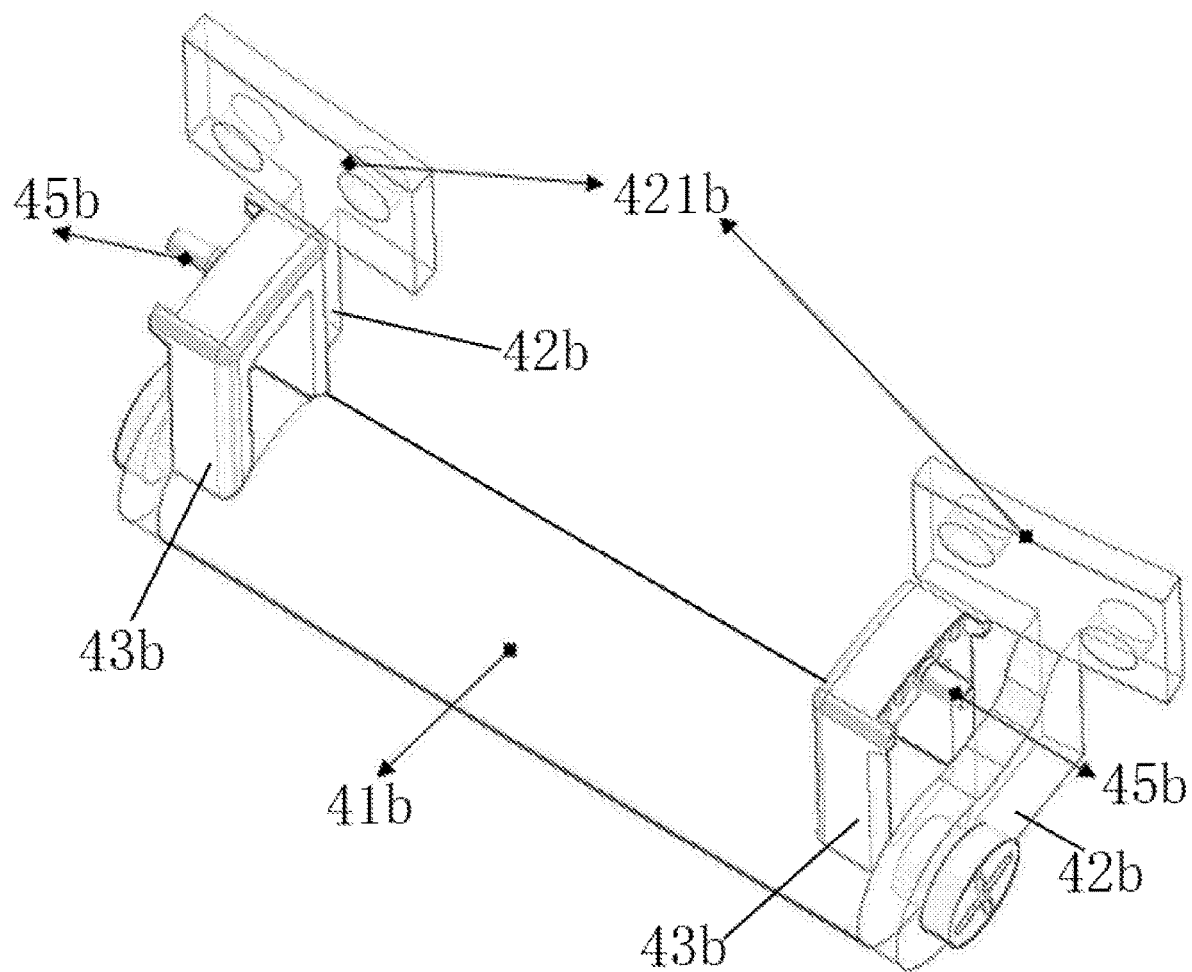
FIG. 8 is a schematic diagram of a second specific structure of a flipping module.

As shown in FIG. 8, FIG. 8 is a schematic diagram of a second specific structure of the flipping module 4.

In the second preferred embodiment of the flipping module 4, the flipping module 4 mainly comprises a connecting shaft 41b, a rotary arm 42b, an angle adjusting disc 43b, a connection seat 44b and a stop stud 45b. The connecting shaft 41b is connected with the sliding plate 33 in the sliding module 3. When the sliding module 3 moves directionally, the connecting shaft 41b moves directionally and synchronously with the sliding module 3. The head end of the rotary arm 42b is sleeved on the connecting shaft 41b, and can rotate around the connecting shaft 41b. At the same time, the tail end of the rotary arm 42a is connected with the foam support 2, and thus drives the foam support 2 to rotate around the connecting shaft 41b together. When the foam bracket 2 rotates, it is equivalent to flipping relative to the middle shell 1, thereby realizing the flipping angle adjustment of the foam bracket 2 on the middle shell 1 and further realizing the wearing angle adjustment of the forehead band.

The angle adjusting disc 43b is disposed on the connecting shaft 41b, generally erected on the circumferential surface of the connecting shaft 41b, and extends along the radial plane of the connecting shaft 41b; it is mainly configured to realize the staged flipping adjustment of the foam support 2. One end of the connection seat 44b is connected to the foam support 2, and the other end (tail end) extends to the angle adjusting disc 43b and faces the surface of the angle adjusting disc 43b. The stop stud 45b is disposed on the surface of the tail end of the connection seat 44b, so that the tail end of the stop stud 45b is close to the angle adjusting disc 43b, and drives the stop stud 45b to rotate synchronously with the foam support 2.

Figure 10:
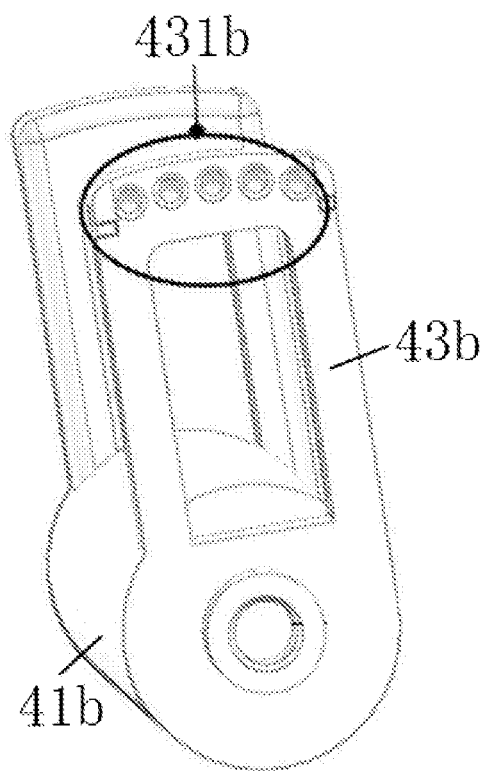
FIG. 10 is a schematic diagram of the specific structure of an angle adjusting disc.

As shown in FIG. 10, FIG. 10 is a schematic diagram of the specific structure of the angle adjusting disc 43b.

The surface of the angle adjusting disc 43b is provided with several stop grooves 431b used to match with the stop stud 45b. The tail end of the stop stud 45b can be locked at the current rotating position by the stop grooves 431b. At the same time, the distribution of the stop grooves 431b on the angle adjusting disc 43b corresponds to the rotation movement track of the stop stud 45b along with the flipping of the foam support 2. The tail end of the stop stud 45b is elastic, and can be clamped into the stop groove 431b to be locked through elastic deformation, and can also be separated from the stop groove 431b through elastic deformation.

In this way, when the user rotates the foam support 2, the foam support 2 will flip, and then drive the stop stud 45b to rotate synchronously. In this process, the tail end of the stop stud 45b is elastically deformed by the butting force from the side wall of the stop groove 431b, so that the tail end of the stop stud 45b is separated from the stop groove 431b in which the stop stud 45b is currently clamped, and then rotates to a small extent synchronously with the foam support 2. Finally, the tail end of the stop stud 45b recovers to its original state under the elastic restoration force, and is clamped into another stop groove 431b, thereby entering the locked state again.

Figure 11:
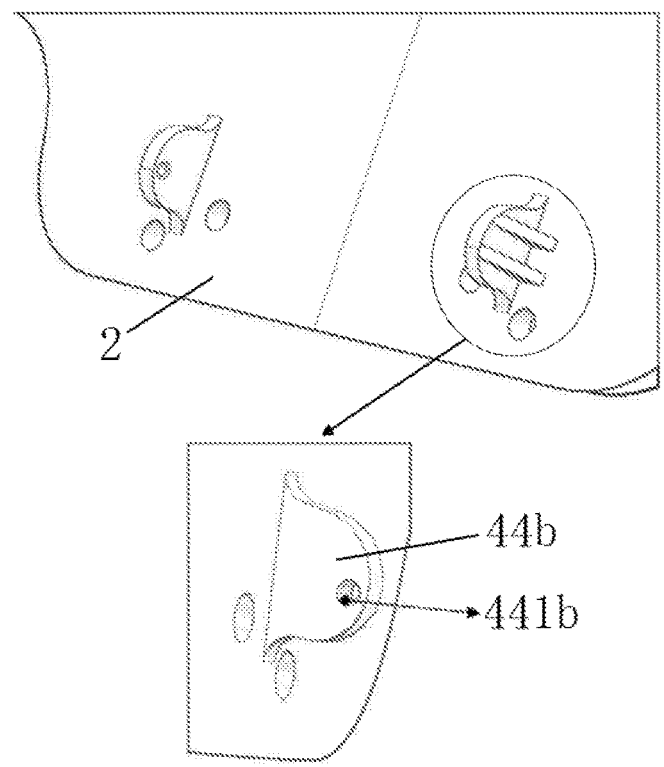
FIG. 11 is a schematic diagram of the specific structure of a connection seat in this embodiment.

As shown in FIG. 11, FIG. 11 is a schematic diagram of the specific structure of the connection seat 44b in this embodiment.

In order to facilitate the disassembly and maintenance of the stop stud 45b on the connection seat 44b, in this embodiment, the stop stud 45b and the connection seat 44b are detachably connected. Specifically, the connection seat 44b is erected on the outer wall surface of the foam support 2 and protrudes a certain height from the surface of the foam support 2. At the same time, an insertion hole 441b is formed on the surface of the tail end of the connection seat 44b, and the head end of the stop stud 45b is inserted into the insertion hole 441b. Generally, the detachable connection can be realized by fixing the stop stud 45b in the insertion hole 441b with bolts or other fasteners, or by attracting the head end of the stop stud 45b with the iron core of the electromagnet. Of course, the head end of the stop stud 45b can also be directly fixed in the insertion hole 441b.

In order to ensure stable connection and rotation balance, two rotary arms 42b are generally provided, and their head ends are respectively connected to the left and right sides of foam support 2 via the connecting plates 421b. At the same time, tail ends of the rotary arms 42b are sleeved at two ends of the connecting shaft 41b. In order to prevent the tail end of the rotary arm 42b from slipping out of the connecting shaft 41b along the axial direction, the end face of the connecting shaft 41b is also provided with a fastening hole to butt with the rotary arm 42b through the engagement of fasteners and fastening holes without hindering its normal rotation.

Figure 9:
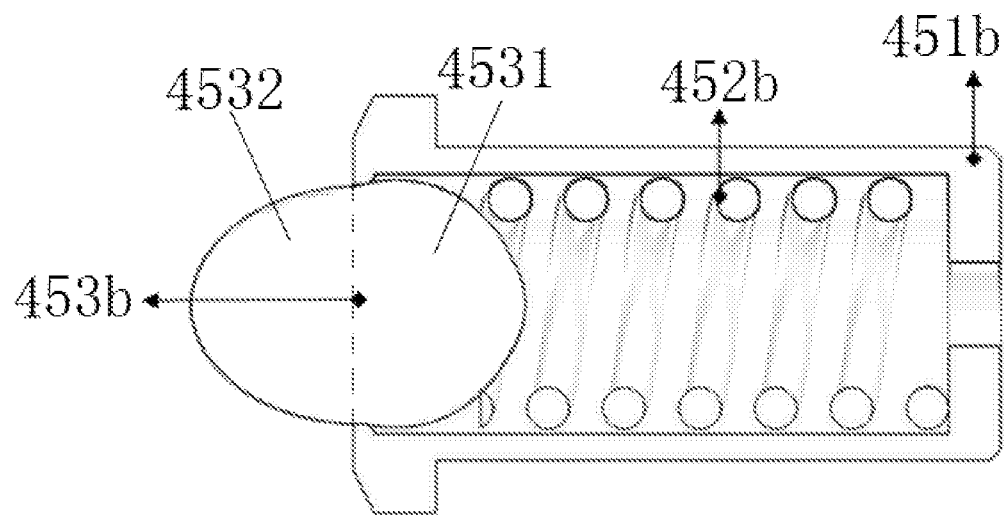
FIG. 9 is a schematic diagram of the specific structure of a stop stud.

As shown in FIG. 9, FIG. 9 is a schematic diagram of the specific structure of the stop stud 45b.

In a preferred embodiment of the stop stud 45b, the stop stud 45b mainly comprises a stop cylinder 451b, a return spring 452b and an elastic ball 453b. The stop cylinder 451b is integrally inserted into the insertion hole 441b on the connection seat 44b. The return spring 452b is disposed in the stop cylinder 451b, and its elastic force direction is the axial direction of the stop cylinder 451b. The elastic ball 453b is stuffed at the opening of the stop cylinder 451b and protrudes outward for a certain distance. At the same time, one end of the return spring 452b is connected with the inner side of the elastic ball 453b, while the other end of the return spring 452b is connected with the bottom of the stop cylinder 451b.

The actual shape of the elastic sphere 453b is not an ideal sphere, but closer to an ellipsoid; it mainly includes two parts, namely, the blunt end 4531 and the sharp end 4532. The radius of the blunt end 4531 is larger, and it is clamped into the opening of the stop cylinder 451b as a whole. It cannot be pushed out of the opening by the elastic force of the return spring 452b, but it can slide in the stop cylinder 451b to ensure that the elastic ball 453b is clamped and locked at the opening. The radius of the sharp end 4532 is smaller. The sharp end 4532 protrudes out of the opening of the stop cylinder 451b as a whole and can easily produce elastic deformation. It is mainly configured to clamp into the stop groove 431b on the angle adjusting disc 43b through elastic deformation, and lock the elastic ball 453b in the corresponding stop groove 431b. At the same time, it can also be separated from the current stop groove 431b through elastic deformation, and then clamped again into another stop groove 431b.

Figure 12:
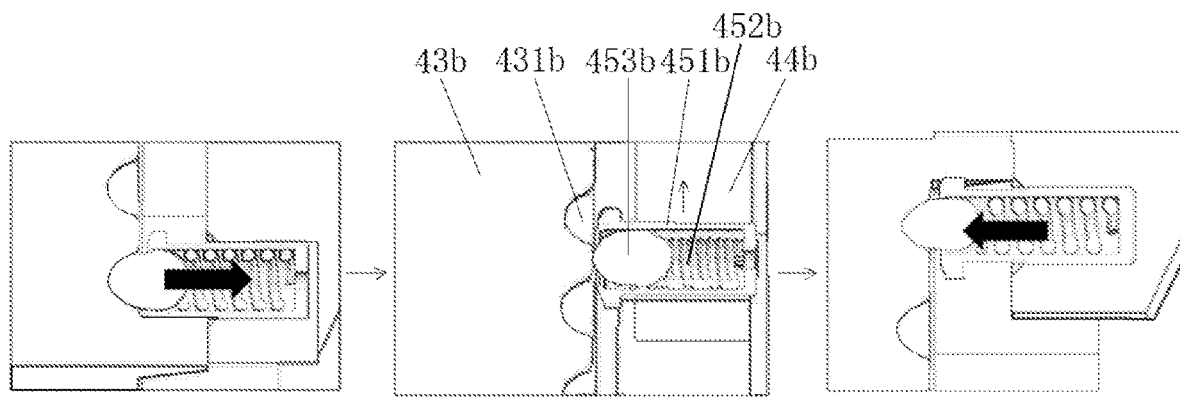
FIG. 12 is a schematic diagram of a staged clamping transmission process between a stop stud and stop grooves.

As shown in FIG. 12, FIG. 12 is a schematic diagram of the staged clamping transmission process between the stop stud 45b and the stop groove 431b.

In this way, in the normal state (without adjusting the wearing angle), two ends of the return spring 452b maintain a compressed state between the blunt end 4531 of the elastic ball 453b and the bottom surface of the stop cylinder 451b. The elastic force enables the sharp end 4532 of the elastic ball 453b clamping into the stop groove 431b through elastic deformation, so that the stop stud 45b and the stop groove 431b remain locked.

When adjusting the wearing angle, the user rotates the foam support 2 so that the foam support 2 flips and further drives the stop stud 45b to rotate synchronously. An inclined butting force is generated between the sharp end 4532 of the stop ball and the contact surface of the stop groove 431b. The axial component of the butting force is used to overcome the elastic force of the return spring 452b, so that the elastic ball 453b goes deep into the stop cylinder 451b and the sharp end 4532 of the elastic ball 453b is separated from the current stop groove 431b. Then, the circumferential component of the butting force is used to drive the sharp end 4532 of the elastic ball 453b to rotate at a small angle to reach a new stop groove 431b. Finally, the elastic ball 453b is pressed again under the elastic force of the return spring 452b, and the sharp end 4532 keeps engaged with the stop groove 431b, thereby completing the staged flipping angle adjustment of the foam support 2.

In order to facilitate the circumferential rotation of the elastic ball 453b, the stop groove 431b is arc-shaped.

Figure 13:
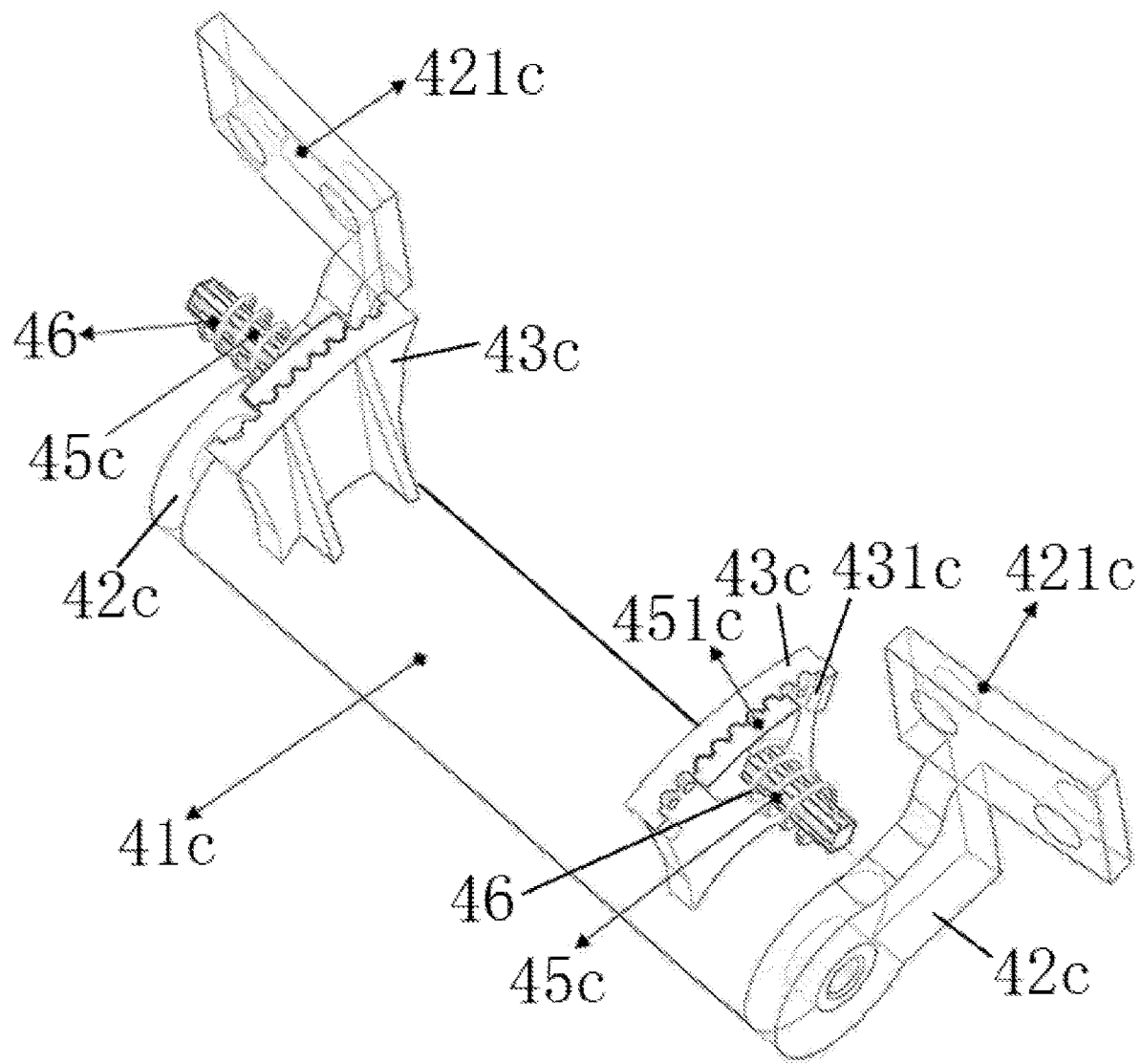
FIG. 13 is a schematic diagram of a third specific structure of a flipping module.

As shown in FIG. 13, FIG. 13 is a schematic diagram of a third specific structure of the flipping module 4.

In the third preferred embodiment of the flipping module 4, the flipping module 4 mainly comprises a connecting shaft 41c, a rotary arm 42c, a fixed adjusting plate 43c, a connection seat 44c and a movable adjusting rod 45c. The connecting shaft 41c is connected with the sliding plate 33 in the sliding module 3. When the sliding module 3 moves directionally, the connecting shaft 41c moves directionally and synchronously with the sliding module 3. The head end of the rotary arm 42c is sleeved on the connecting shaft 41c, and can rotate around the connecting shaft 41c. At the same time, the tail end of the rotary arm 42a is connected with the foam support 2, and thus drives the foam support 2 to rotate around the connecting shaft 41c together. When the foam bracket 2 rotates, it is equivalent to flipping relative to the middle shell 1, thereby realizing the flipping angle adjustment of the foam bracket 2 on the middle shell 1 and further realizing the wearing angle adjustment of the forehead band.

The fixed adjusting plate 43c is disposed on the connecting shaft 41b, generally erected on the circumferential surface of the connecting shaft 41c, and extends along the radial plane of the connecting shaft 41c; it is mainly configured to realize the staged flipping adjustment of the foam support 2. One end of the connection seat 44c is connected to the foam support 2, and the other end (tail end) extends to the fixed adjusting plate 43c and faces the surface of the fixed adjusting plate 43c. The connection seat 44c is mainly configured to install the movable adjusting rod 45c, so that the tail end of the movable adjusting rod 45c is close to the fixed adjusting plate 43c, and drives the movable adjusting rod 45c to flip synchronously with the foam support 2.

The movable adjusting rod 45c is inserted in the connection seat 44c, and can perform axial telescopic movement on the connection seat 44c. Multiple end face teeth 451c are provided on the end face of the movable adjusting rod 45c, which can synchronously move axially and reciprocally with the axial telescopic movement of the movable adjusting rod 45c. The distribution of the end face teeth 451c on the end face of the movable adjusting rod 45c corresponds to the flipping movement track of the movable adjusting rod 45c.

Figure 15:
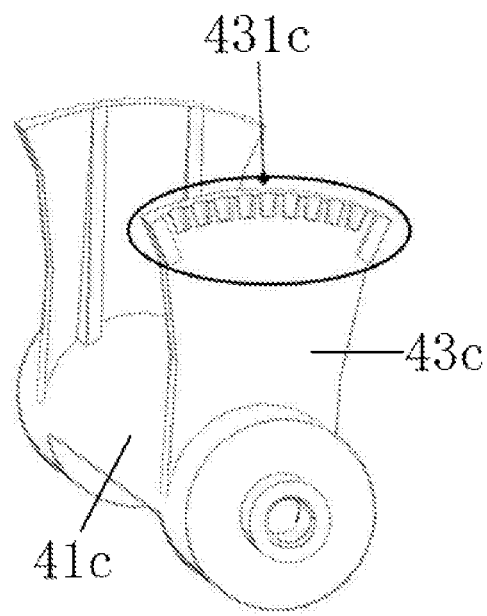
FIG. 15 is a schematic diagram of the specific structure of a fixed adjusting plate.

As shown in FIG. 15, FIG. 15 is a schematic diagram of the specific structure of the fixed adjusting plate 43c.

Correspondingly, the surface of the fixed adjusting plate 43c is provided with multiple tooth shaped grooves 431c for engaging with each end face tooth 451c, so that during the axial telescopic movement of the movable adjusting rod 45c, the end face teeth 451c are separated from the currently engaged tooth shaped groove 431c and then rotates with the flipping movement of the movable adjusting rod 45c to engage again with another corresponding tooth shaped groove 431c. Obviously, the distribution of tooth shaped grooves 431c on the surface of fixed adjusting plate 43c is the same as that of end face teeth 451c on the end face of movable adjusting rod 45c.

In order to facilitate that the end face teeth 451c can smoothly disengage from the tooth shaped grooves 431c and normally engage with the tooth shaped grooves 431c during the axial telescopic movement of the movable adjusting rod 45c, in this embodiment, the telescopic direction of the movable adjusting rod 45c is perpendicular to the surface of the fixed adjusting plate 43c, that is, the movable adjusting rod 45c is perpendicular to the fixed adjusting plate 43c. Correspondingly, the head end of the connection seat 44c is connected to the foam support 2, while its tail end extends to the surface of one side of the fixed adjusting plate 43c; moreover, the surface of the tail end of the connection seat 44c is kept at a certain distance from the surface of the fixed adjusting plate 43c, so as to install the movable adjusting rod 45c and facilitate the axial telescopic movement of the movable adjusting rod 45c.

In order to ensure stable connection and rotation balance, two rotary arms 42c are generally provided, and their head ends are respectively connected to the left and right sides of foam support 2 via the connecting plates 421c. At the same time, tail ends of the rotary arms 42c are sleeved at two ends of the connecting shaft 41c. In order to prevent the tail end of the rotary arm 42c from slipping out of the connecting shaft 41c along the axial direction, the end face of the connecting shaft 41c is also provided with a fastening hole to butt with the rotary arm 42c through the engagement of fasteners and fastening holes without hindering its normal rotation.

Figure 14:
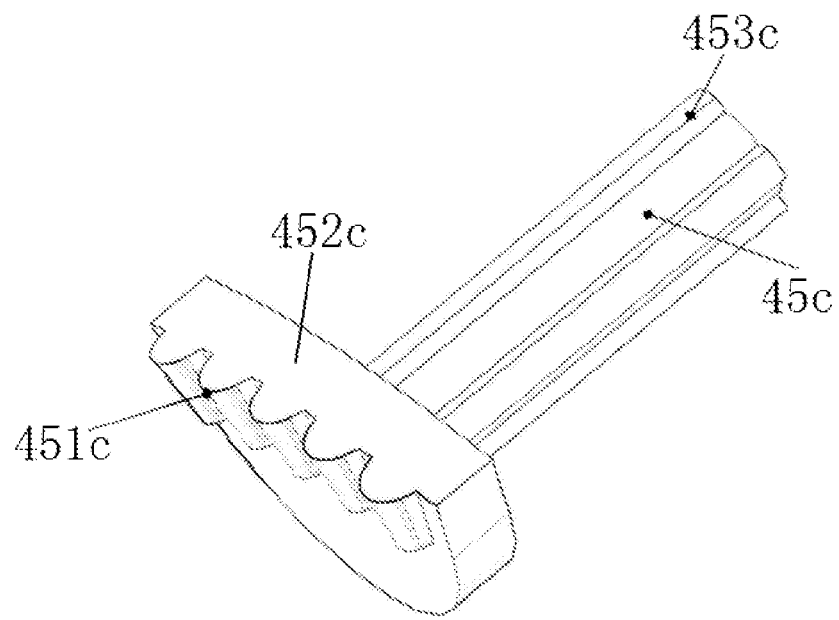
FIG. 14 is a schematic diagram of the specific structure of a movable adjusting rod.

As shown in FIG. 14, FIG. 14 is a schematic diagram of the specific structure of the movable adjusting rod 45c.

In a preferred embodiment of the movable adjusting rod 45c, in order to facilitate the design of the end face teeth 451c, in this embodiment, the tail end of the movable adjusting rod 45c is connected with an arc-shaped plate 452c and the end face teeth 451c are distributed on the surface of the arc-shaped plate 452c. Specifically, since the distribution of the end face teeth 451c corresponds to its rotation track along with the rotation of the movable adjusting rod 45c, the arc-shaped structure of the arc-shaped plate 452c also corresponds to the rotation track of the movable adjusting rod 45c and is equivalent to a partial sector area of a complete gear.

Figure 16:
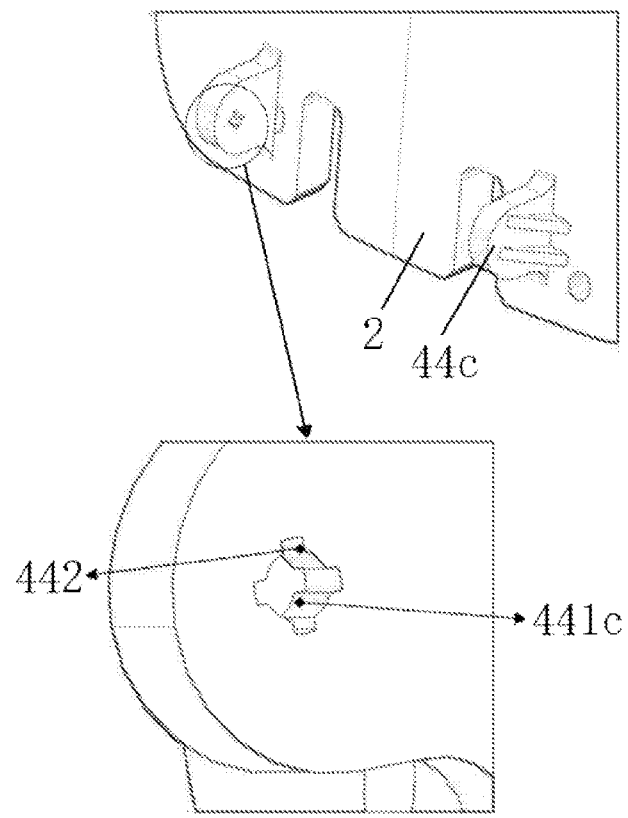
FIG. 16 is a schematic diagram of the specific structure of a connection seat in this embodiment.

As shown in FIG. 16, FIG. 16 is a schematic diagram of the specific structure of the connection seat 44c in this embodiment.

To facilitate the connection between the connection seat 44c and the movable adjusting rod 45c, in this embodiment, the connection seat 44c is specifically erected on the outer wall surface of the foam support 2, and protrudes a certain height from the surface of the foam support 2. At the same time, the tail end of the connection seat 44c extends to one side of the surface of the fixed adjusting plate 43c on the connecting shaft 41c.

Further, an insertion hole 441c is formed on the surface of the tail end of the connection seat 44c, and the head end of the movable adjusting rod 45c can be inserted into the insertion hole 441c and performs the axial telescopic movement in the insertion hole 441c. At the same time, a preload spring 46 is sleeved on the movable adjusting rod 45c. The preload spring 46 is inserted into the insertion hole 441c, one end of the preload spring 46 is butted with the inner wall of the insertion hole 441c, and the other end of the preload spring 46 is butted with the surface of the arc-shaped plate 452c.

Figure 17:
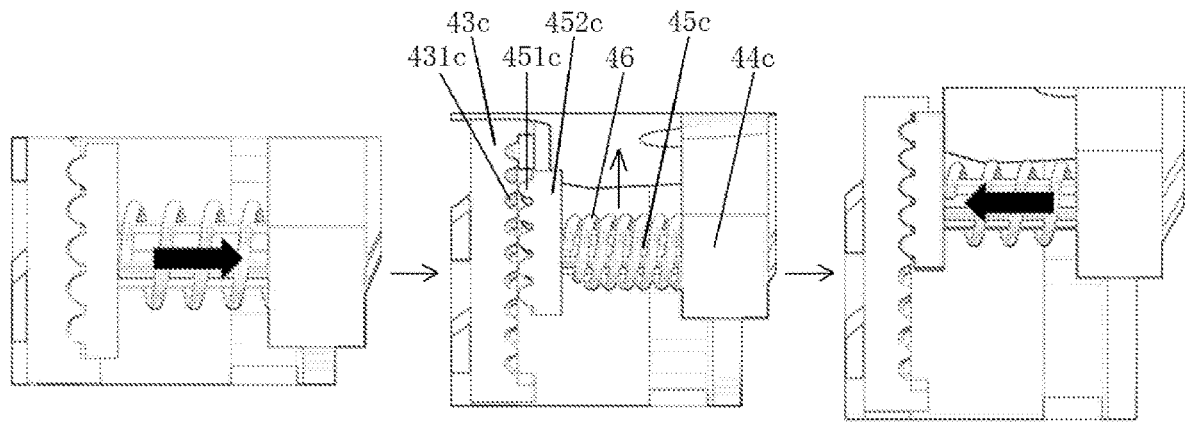
FIG. 17 is a schematic diagram of a staged engaging transmission process between end face teeth and tooth shaped grooves.

As shown in FIG. 17, FIG. 17 is a schematic diagram of the staged engagement transmission process between the end face teeth 451c and the tooth shaped grooves 431c.

In this way, in the normal state (without adjusting the wearing angle), two ends of the preload spring 46 maintain a compressed state between the arc-shaped plate 452c and the insertion hole 441c, and the elastic force presses the end face teeth 451c on the arc-shaped plate 452c into the corresponding tooth shaped grooves 431c, so that the end face teeth 451c and the tooth shaped grooves 431c remain engaged.

When adjusting the wearing angle, the user rotates the foam support 2 so that the foam support 2 clips and further drives the movable adjusting rod 45c to rotate synchronously. An inclined butting force is generated between the end face teeth 451c and the tooth shaped grooves 431c. The axial component of the butting force is used to overcome the elastic force of the preload spring 46, so that the movable adjusting rod 45c goes deep into the insertion hole 441c and the end face teeth 451c are separated from the current tooth shaped grooves 431c. Then, the circumferential component of the butting force is used to drive the end face teeth 451c to rotate at a small angle to reach new tooth shaped grooves 431c. Finally, the end face teeth 451c are pressed again under the elastic force of the preload spring 46, and keep engaged with new tooth shaped grooves 431c, thereby completing the staged flipping angle adjustment of the foam support 2.

Generally, in order to facilitate the circumferential rotation of the end face teeth 451c, the end face teeth 451c and the tooth shaped grooves 431c are both arc-shaped.

In order to improve the movement synchronization between the movable adjusting rod 45c and the foam support 2, in this embodiment, multiple position-limiting ribs 453c are provided on the circumferential surface of the movable adjusting rod 45c, and multiple stop grooves 442 are provided on the radial direction of the insertion hole 441c of the connection seat 44c. When the movable adjusting rod 45c is inserted into the insertion hole 441c, the position-limiting ribs 453c are inserted into the stop grooves 442 at the same time. The stop groove 442 is configured to limit the circumferential position of the position-limiting rib 453c to prevent the movable adjusting rod 45c from rotating circumferentially in the insertion hole 441c. The movable adjusting rod 45c is allowed to perform the axial telescopic movement only.

The present disclosure also provides a head-mounted display apparatus, which mainly comprises an adjusting mechanism. The specific content of the mechanism is the same as the related content described above, and will not be repeated here.

The above description of the disclosed embodiments enables those skilled in the art to realize or use the present disclosure. Various modifications to these embodiments will be apparent to those skilled in the art. The general principles defined herein can be implemented in other embodiments without departing from the spirit or scope of the present disclosure. Therefore, the present disclosure will not be limited to the embodiments shown herein, but will conform to the widest scope consistent with the principles and novel features disclosed herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An adjusting mechanism, comprising a middle shell (1) and a foam support (2), wherein the adjusting mechanism further comprises:

a sliding module (3) movably arranged in the middle shell (1), connected with the foam support (2), and configured to adjust a horizontal spacing between the middle shell (1) and the foam support (2), and a flipping module (4) rotatably arranged on the sliding module (3), connected with the foam support (2), and configured to drive the foam support (2) to flip relative to the middle shell (1), the sliding module (3) comprises: a mounting bracket (31) connected with an inner wall of the middle shell (1); a guide bracket (32) arranged on a surface of the mounting bracket (31); and a sliding plate (33) slidably arranged on the guide bracket (32) and connected with the flipping module (4), wherein a surface of the guide bracket (32) is also provided with an elastic sheet (37) bulging upward, a bottom surface of the sliding plate (33) is provided with multiple stages of parking slots (38) bulging downward and configured to clamp a top end of the elastic sheet (37), and an arrangement direction of each stage of the parking slots (38) is parallel to a sliding direction of the sliding plate (33), two ends of the elastic sheet (37) are respectively connected to the surface of the guide bracket (32), and a middle part of the elastic sheet (37) is arched into an arc shape.

2. The adjusting mechanism according to claim 1, wherein both sides of a surface of the guide bracket (32) are provided with a guide rail (34) extending along its length direction for sliding in cooperation with two side edges of the sliding plate (33).

3. The adjusting mechanism according to claim 1, wherein a surface of the guide bracket (32) is provided with an inner stop block (35) and an outer stop block (36), the inner stop block (35) is configured to butt against an inner end wall of the sliding plate (33) to limit a maximum distance that the sliding plate (33) slides inward, and the outer stop block (36) is configured to butt against an outer end wall of the sliding plate (33) to limit a maximum distance that the sliding plate (33) slides outward.

4. The adjusting mechanism according to claim 1, wherein the flipping module (4) comprises a connecting shaft (41a) connected with a tail end of the sliding module (3), and a rotary arm (42a) rotatably sleeved on the connecting shaft (41a), and a tail end of the rotary arm (42a) is connected with the foam support (2).

5. The adjusting mechanism according to claim 4, wherein both ends of the connecting shaft (41a) are provided with ring grooves (411), the rotary arms (42a) are respectively accommodated in the ring grooves (411), and side walls of the ring grooves (411) are closely attached to the surfaces of the rotary arms (42a) to form damping friction.

6. The adjusting mechanism according to claim 5, wherein an outer wall of the ring groove (411) is a head end of a pressing rod (43a) inserted in an end face of the connecting shaft (41a), and an end surface of the head end of the pressing rod (43a) is provided with a knob (44a) configured to adjust a preload of the pressing rod (43a).

7. The adjusting mechanism according to claim 5, wherein an inner wall surface of the ring groove (411) is provided thereon with a position-limiting groove (412) extending in a circumferential direction, and an inner surface of the rotary arm (42a) is provided thereon with a butting block (422) configured to butt with walls at both ends of the position-limiting groove (412) to limit a range of rotation angle of the rotary arm (42a).

8. The adjusting mechanism according claim 1, wherein the flipping module (4) comprises: a connecting shaft (41b) connected with a tail end of the sliding module (3), a rotary arm (42b) rotatably sleeved on the connecting shaft (41b) and connected with the foam support (2), an angle adjusting disc (43b) arranged on the connecting shaft (41b), a connection seat (44b) connected to the foam support (2) and extending to the angle adjusting disc (43b), and a stop stud (45b) arranged on the surface of the connection seat (44b); and a surface of the angle adjusting disc (43b) is provided with several stop grooves (431b) configured to match with the stop stud (45b) to lock the stop stud (45b) in a current rotation position.

9. The adjusting mechanism according to claim 8, wherein the angle adjusting disc (43b) is erected on the circumferential surface of the connecting shaft (41b), the stop stud (45b) is perpendicular to a surface of the angle adjusting disc (43b), a surface of the connection seat (44b) is provided with an insertion hole (441b), and a head end of the stop stud (45b) is detachably inserted into the insertion hole (441b).

10. The adjusting mechanism according to claim 9, wherein the stop stud (45b) comprises: a stop cylinder (451b) inserted in the insertion hole (441b), a return spring (452b) axially connected in the stop cylinder (451b), and an elastic ball (453b) stuffed at an opening of the stop cylinder (451b) and projecting outwards; and an end of the return spring (452b) is connected with the elastic ball (453b).

11. The adjusting mechanism according to claim 10, wherein the elastic ball (453b) comprises a blunt end (4531) and a sharp end (4532) connected as a whole, the blunt end (4531) is clamped at the opening of the stop cylinder (451b), and the sharp end (4532) extends out of the opening of the stop cylinder (451b) and is matched with the stop groove (431b).

12. The adjusting mechanism according to claim 1, wherein the flipping module (4) comprises: a connecting shaft (41c) connected with a tail end of the sliding module (3), a rotary arm (42c) rotatably sleeved on the connecting shaft (41c) and connected with the foam support (2), a fixed adjusting plate (43c) arranged on the connecting shaft (41), a connection seat (44c) connected to the foam support (2) and extended to the fixed adjusting plate (43c), and a movable adjusting rod (45c) inserted in the connection seat (44c) in an axially retractable manner; an end face of the movable adjusting rod (45c) is provided with a plurality of end face teeth (451c) distributed along its flipping track; and a surface of the fixed adjusting plate (43c) is provided with a plurality of tooth shaped grooves (431c) for engaging with the end face teeth (451c).

13. The adjusting mechanism according to claim 12, wherein the fixed adjusting plate (43c) is erected on a circumferential surface of the connecting shaft (41c), the retraction direction of the movable adjusting rod (45c) is perpendicular to the surface of the fixed adjusting plate (43c), a tail end of the movable adjusting rod (45c) is connected with an arc-shaped plate (452c), and the end face teeth (451c) are distributed on a surface of the arc-shaped plate (452c).

14. The adjusting mechanism according to claim 12, wherein an insertion hole (441c) is provided on a surface of the connection seat (44c), a head end of the movable adjusting rod (45c) is inserted into the insertion hole (441c) in a retractable manner, and the movable adjusting rod (45c) is sleeved with a preload spring (46) for compressing a tail end of the movable adjusting rod (45c) against the fixed adjusting plate (43c) through an elastic force.

15. The adjusting mechanism according to claim 14, wherein multiple position limiting ribs (453c) are provided on a circumferential surface of the movable adjusting rod (45c), and multiple stop grooves (442) are provided on a radial direction of the insertion hole (441c) for sliding in cooperation with the position-limiting ribs (453c) to limit a degree of rotation freedom of the movable adjusting rod (45c).

16. A head-mounted display apparatus comprising an adjusting mechanism according to claim 1.

* * * * *